July 15, 1952  W. C. ROE  2,603,769
ALTERNATING CURRENT FREQUENCY CONVERTER
Filed Oct. 12, 1949
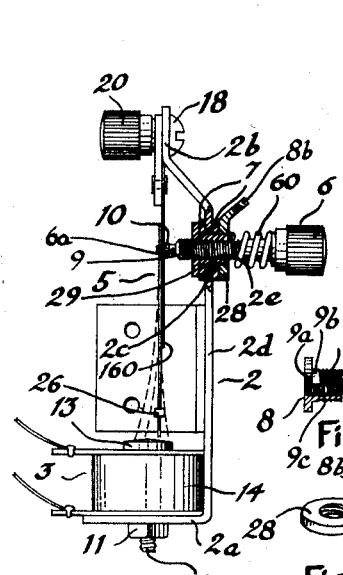
Fig. 1
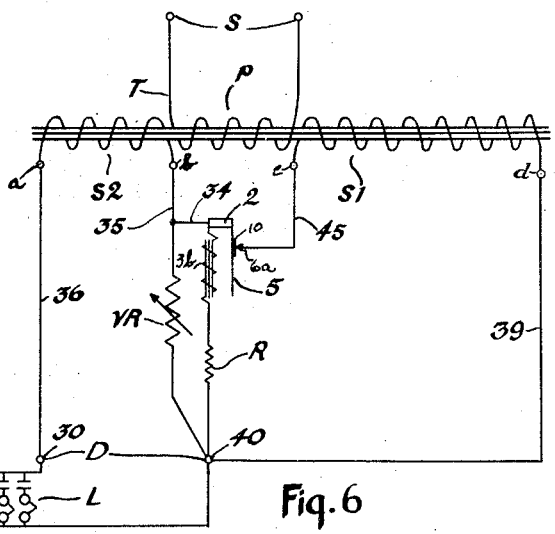
Fig. 6
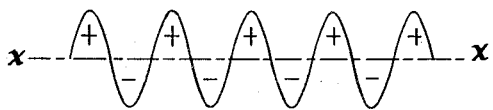
Fig. 8
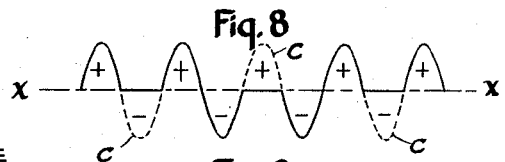
Fig. 9
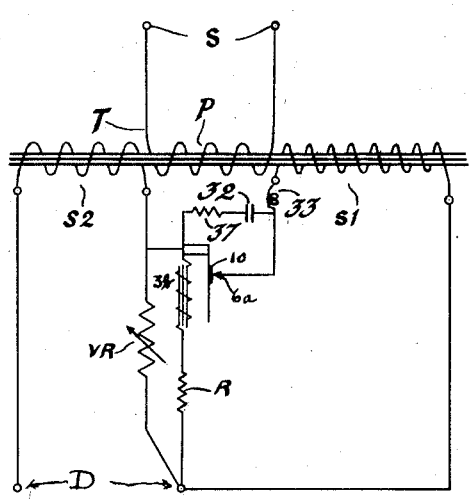
Fig. 7
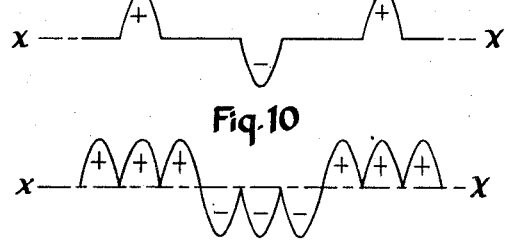
Fig. 10
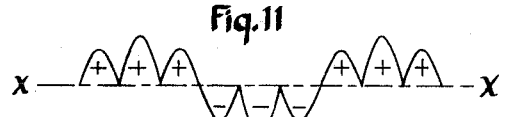
Fig. 11
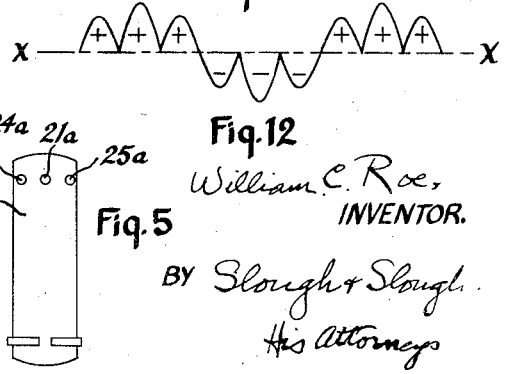
Fig. 12
William C. Roe,
INVENTOR.
BY Slough & Slough
His Attorneys
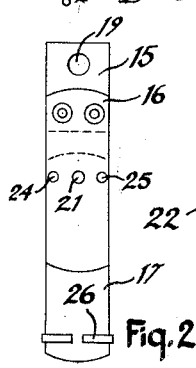
Fig. 2
Fig. 3
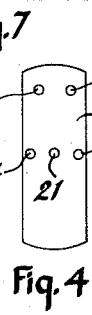
Fig. 4
Fig. 5

Patented July 15, 1952

2,603,769

UNITED STATES PATENT OFFICE 2,603,769

ALTERNATING CURRENT FREQUENCY CONVERTER

William C. Roe, Elyria, Ohio, assignor to Telkor, Inc., Elyria, Ohio, a corporation of Ohio Application October 12, 1949, Serial No. 120,981

6 Claims. (Cl. 321—70)

My invention relates to alternating current convertors and more particularly relates to an improved electrical circuit system for converting an alternating current of a relatively high frequency to an alternating current having the function of a relatively fractional frequency through the instrumentality of a vibrating reed.

My invention relates to that general type of vibratile reed circuit controllers which are disclosed in my prior patents, No. 1,646,662, dated October 25, 1927, and No. 1,854,863, dated April 19, 1932, the present application relating to improvements over the method and electrical circuit system disclosed in my said prior patents.

An object of my present invention is to provide an improved electrical system for an alternating current convertor for converting an alternating current of a relatively high frequency to one having the full functional effect of a relatively low frequency, in a novel manner.

Another object of my invention is to provide an improved reed-controlled alternating current convertor system wherein supplied alternating current impulses of any available voltage and of relatively high frequency are delivered to a current delivery circuit at any desired voltage, and with each third one of said impulses being of relatively reversed polarity, whereby there will be delivered to the said current supply circuit an electrical current wherein three successive current impulses are of the same polarity whereas the three succeeding current impulses are of opposite polarity to thereby achieve a delivered electrical current the effective frequency of which, upon alternating current telephone bells, and upon numerous other electro-responsive devices, will be one-third of the frequency of the energizing source of alternating current.

Another object of my invention is to provide an improved electrical system for converting a received alternating current to a delivered current having a plurality of successive impulses of corresponding polarity, which is immediately followed by a corresponding number of successive current impulses but which are of relatively opposite polarity, whereby the frequency of the delivered current as determined by the number of alternations of polarity is fractional with respect to the frequency of the said received alternating current.

Another object of my invention is to achieve the preceding, or any other above recited object in a manner whereby the said delivered current may have the functional effect of substantially any desired "square-root-of-mean-square" effective alternating current voltage whenever any substantial load is imposed upon the current delivery terminals of the convertor.

Another object of my invention is to provide an improved electrical circuit system equipped with circuit instrumentalities of a type and kind whereby the foregoing objects are more efficiently achieved than in my said prior patents, and whereby the delivered current will be of a more desirable wave form than heretofore realized in the use of convertors of this general type.

Another object of my invention is to achieve, in a novel manner each of the foregoing objectives, as a result of a periodic interruption of merely a single pair of electrical contacts.

Other objects of my invention and the invention itself will be apparent to those skilled in the art to which my invention relates by reference to the following specification containing a description of a preferred embodiment of my invention and in which reference is made to the accompanying drawings illustrating the said embodiment.

In the drawings:

Fig. 1 is a side elevational view, of a magnetic reed mechanism employed to achieve the objects of my present invention;

Fig. 2 is a plan view of the single vibratile reed of the convertor;

Figs. 3, 4 and 5 being similar views of parts which, when joined together, form the reed of Fig. 2;

Fig. 6 shows diagrammatically an electrical circuit comprising the reed device of Fig. 1 in association with certain diagrammatically illustrated circuit instrumentalities;

Fig. 7 is a diagram of a modified form of an electric circuit adapted to be employed with the reed device of Fig. 1;

Fig. 8 diagrammatically shows successive impulses of alternate polarity of a supplied alternating current, as delivered to the convertor;

Figs. 9, 10, 11 and 12 are diagrams which, from the following description, will assist in conveying a complete understanding of the modus operandi and structural parts of the convertor of my invention;

Figs. 13 and 14 are respectively perspective and side elevational views of co-operative clamping elements for the reed device, Fig. 14, however, showing a lower portion of one of the said elements in section.

Referring now to the drawings in each of which the same structural parts, the same portions of the current wave diagrams, and the same portions of the circuit conductors, are indicated by like reference characters, the vibratile reed unit shown in Fig. 1 comprises a preferably mild steel frame 2, to the flange 2a thereof, an electromagnet 3 is secured by a nut 11 which is threaded onto a reduced threaded end 12 of the magnet core 13 of said electromagnet, the latter having an energizing winding 14 disposed around said core, and the said threaded end of said core being passed through an aperture of said end flange 2a of said frame which affords a portion of the magnetic circuit of said magnet 3.

The compound vibratile reed unit of Fig. 2 comprises parts 15, 16 and 17 respectively shown in Figs. 3, 4 and 5, the part 15 being in the form of a relatively rigid metallic carrying plate for the more resiliently flexible parts of the reed, said part 15 being provided with a relatively large aperture 19 near one end and a pair of relatively laterally interspaced smaller apertures 22 and 23 nearest the other end of the plate.

The reed part 16 comprises a relatively straight thin strip of clock-spring steel, having a pair of apertures 22a and 23a nearest its upper end which correspond in size and relative spacing to the apertures 22 and 23. A series of three small apertures 24, 21 and 25 are disposed across the longitudinal middle of the spring 16.

The spring part 17 is preferably somewhat longer than the spring part 16 and is in the form of a straight thin strip of clock-spring steel and is provided nearest its upper end with a series of interspaced apertures 24a, 21a and 25a, which preferably correspond in size and interspacing to the apertures 24, 21 and 25 of the spring part 16.

A weight element 26, here in the form of a short length of brass wire of rectangular section, is secured to, being preferably bent around, the opposite or longer end of the spring 17 and is initially adapted to be adjusted longitudinally on the strip 17 to afford adjustable variation to the periodicity of vibration of the spring 17.

The assembly of the parts 15, 16 and 17 is preferably achieved by first projecting the reduced base metal shank of a conventional contact element 10 successively through the respective apertures 21 and 21a, of the spring parts 16 and 17 and then heading the extreme end of said shank, the usual iridium-silver or other electrical contact metal contact piece being presented at the outer surface of the spring part 16 whose lower end portion is thus caused to overlap the upper end portion of the relatively longer spring part 17, shank portions of brass or copper rivets are preferably then passed through the laterally adjacent pairs of apertures 24—24a and 25—25a and the rivet shank ends are headed over in the usual manner to rigidly secure the thus riveted portions of the said spring parts 16 and 17 together; then the upper end portion of the spring part 16 and the lower end portion of the plate 15 are relatively superposed to place said plate lowermost, and shanks of rivets are passed through each aligned pair of apertures 22—22a and 23—23a, their shank ends being then headed over in a manner to secure the upper end portion of the spring part 16 to the lower end portion of the plate 15.

Thus assembled the compound reed 1 of Fig. 2 is secured onto an offset end portion 2b of the frame 2, by a machine screw 18 whose shank is successively passed through an aperture of the said offset plate portion 2b and the relatively aligned aperture 19 of the reed mounting plate part 15; a clamping nut 20, which is surfaced with electrical insulating material, is then threaded tightly onto the threaded screw shank to clamp said plate part 15 to said frame.

The said reed is so aligned, by the offset portion 2b of the frame 2, as to dispose its free end closely to but at that side of the center of the rounded or crowned end pole face of the magnet core 13, which is disposed nearest the intermediate straight portion 2d of the frame 2, and with the contact element 10 carried by the reed being presented at that side of the compound reed 5 which is nearest the intermediate portion of said frame 2, and in alignment with the aperture of the intermediate portion of said frame, through which the contact screw 6 is shown to be projected in Fig. 1.

As best shown in section in Fig. 1, and by the showing of Figs. 13 and 14, the parts involved in the mounting of said contact screw 6 comprise a compression spring 60 first telescoped over the screw shank, a pair of like insulating washers 7 having their apertures placed at the two sides of the straight intermediate portion 2d of the frame 2 in alignment with said aperture 2c of said frame, a pair of interthreaded clamping parts 28 and 29, and a third insulating washer 2e adapted to fit within the frame aperture 2c, the externally threaded stem 9 being then telescoped through the frame aperture 2c and the openings of all of said insulating washers.

The clamping part 28, shown best in Fig. 15, is in the form of a metallic internally threaded nut element having a planular body portion and a relatively upturned laterally extending connector portion 8b, which is apertured at x for reception of an end of an electrical conducting wire, and the part 29 which is best shown in Fig. 14 is in the form of an axially bored metallic screw 8, having a hexagonal head 9a and stem 9b, the stem having external threads at 9c and internal threads at 9d.

The threaded stem of said screw part 29 is finally screw-threaded, by its external threads, into the threaded bore of said nut part 28 the insulating washers preventing metallic contact between the shank 9a of said part 29 and the inner edges of the aperture 2e, or any part of the frame 2, said aperture being of greater diameter than said screw shank.

The threaded shank of the contact carrying screw 6, being provided with an insulating thumb screw head portion 6a, is then screw-threaded through the internally threaded bore 9c of the clamping screw part 29 to project the tip 6a of said screw 6, which is in the form of an inserted iridium-silver or other contact element, towards and into contact with the opposing contact element 10 which is carried by the compound reed 5, whereby an electrical circuit is completed between the lug portion 8b of the clamping assembly of elements 28 and 29, through the contacts 6a and 10 to the frame 2 of the reed device of Fig. 1.

The vibrator unit of Fig. 1 is a somewhat improved version of the similar unit of the same type, comprising a compound leaf spring reed which is disclosed in Fig. 1 of my aforesaid Patent No. 1,854,863, and of which that of my earlier Patent No. 1,646,662 is a prototype, vibrates asymmetrically, in the same manner, as here briefly described.

As described the compound reed 5 is provided with a pair of straight flat leaf spring parts, the uppermost part 16 being riveted by its upper end to the relatively non-resilient supporting plate part 15, and when the compound reed is mounted on the frame 2, the spring part 16 extends downwardly beyond the contact 10 to dispose its free end 16b about mid-way between said contact 10 and the crowned pole face of the magnet 3; the somewhat longer leaf spring part 17 joined to the leaf spring part 16 by rivets passed through relatively aligned apertures of the parts 17 and 16 of which those of the spring part 16 are in the longitudinal middle of said part 16, and those of the spring part 17 are near the upper end of the part 17, whereby during swinging movements of said part 17 in that direction wherein it tends to approach the frame part 2d, the part 17 is yieldably restrained by face-to-face engagement of its upper portion with the lower portion of the spring part 16, the lower portions of both spring parts 16 and 17 being at the same time additionally restrained in such directional movement by engagement of the contact 6a with the reed-carried contact 10.

On the other hand these restraints are not in effect when the reed 5 is swinging in the relatively opposite recedent direction with respect to the contact 2a, and frame portion 2d.

At this point it may be stated that the adjustment of the contact point 6a achieved by turning the insulated knob of the adjustment screw 6, is such that the contact point 6a is in normally slight pressure engagement with the contact element 10 which is carried by the vibrator, an electrical current of sufficient voltage, being passed through the vibrator unit of Fig. 1 proceeding from the transformer winding S-1 through the conductor 45 to the contact point 6a and also through the conductor 39 through the resistance unit R to the winding of the magnet 3, the other terminal of said magnet being connected through the frame 2 of the vibrator to the reed 5, will initiate vibration of the reed 5 and such vibration of the reed will be continuous through all periods wherein alternating current from a suitable source is carried to the terminals S so as to cause a flow of such current through the primary winding P, whereby current is induced in the secondary winding S-1 and thence through the vibrator current above described.

It is to be noted that since the tip end of said compound reed 5 is disposed at one side of the apex of the crowned pole face of the iron core 13 of the magnet 3, the end of the reed 5, which is the armature of the electromagnet, will be moved outwardly whenever said contacts 10—6a are closed, to direct electrical current through said magnet, which is not of the polarized type.

During relatively inward or approaching movements of the reed 5, the travel of the free end of said reed which carries the weight 26 is thus progressively shortened by the successive effects of inter-engagement of the contacts 10 and 6a, and face-to-face inter-engagement between the portions of the reeds 16 and 17 which are disposed below said contacts.

Inter-engagement of, or "closing" of the set of contacts 10 and 6a sets up additional opposing magnetically created force to the continued inward movement of the weighted free end portion of the reed since the energizing electrical circuit, later described, of the magnet 3 is closed to effect a magnetic pull upon said reed end at first tending to stop its inward movement and then accelerating its opposite or outward resiliently retractive movement.

So much potential energy is stored in the spring structure of the reed 5 following "closure" of the contacts 10 and 6a that the retractive effort of said spring is strongly added to the magnetic pull exercised by the magnet upon said free end of the spring, that the spring is moved in the said relatively recedent direction to "break" or separate the contacts 10 and 6a, and when so moved the portion of the spring part 17 which is disposed below said contacts 10—6a is progressively upwardly separated from the previously engaged face portions of the spring part 16 and with accompanying flexure of the uppermost portion of the spring part 16 which is disposed between the part 15 and the upper end of the part 17, the weighted free end of the reed 5 is swung to a greater distance over a period of time which, in the embodiment shown and described, is twice as long as the period of time during which the contacts 10 and 6a are inter-engaged, or "closed."

Therefore, during the period of each complete vibration cycle of the reed, the contacts are "closed" for one-third of said period, and are continuously "open" for two-thirds of said period.

The alternating current transformer shown diagrammatically in Figs. 6 and 7 is preferably of the efficient conventional closed magnetic circuit type and the primary winding is also conventionally disposed on the core of said transformer, and the circuit connections to the secondary windings are such that when both are in relatively serial circuit between the current delivery terminals D as shown, and/or in other words, in serial circuit with the load L which may comprise telephone bells and which bells or other load are connected to said terminals D, the two secondary windings are in opposing relation to each other.

While the relative number of convolutions in the three transformer windings are subject to variation, within the purview of my invention, for the purpose of describing one embodiment of my invention, it will be assumed that the primary winding P of the transformer, which is assumed to be energized from a source of alternating current having a frequency of 60 cycles and a voltage of 115 volts, contains 1150 convolutions.

Under such a condition the winding S-1 may be presumed to have 2020 convolutions, and the winding S-2, will be assumed to have 1030 convolutions, the convolutions in the two windings S-1 and S-2 being in close approximation to the ratio of 2:1, and it will be understood that the voltages induced in the windings S-1 and S-2 will be 202 volts and 103 volts respectively.

At this point for the convertor circuit instrumentalities contemplated in the presented described embodiment it may be assumed that the resistance unit R is of 3000 ohms, the ohms resistance of the winding 3b of the magnet 3 is 200 ohms and the resistance VR is in the form of a carbon filament lamp of two candle power having a rating of 115 volts and having a normal cold temperature resistance of approximately 1000 ohms and having a negative co-efficient resistivity.

Under these assumptions when the contacts 10—6a are "open," during a magnetically induced forward excursion of the reed 5, the low voltage secondary winding S-2 is connected to the discharge terminals D, and any load such as telephone bells which may be connected thereto, current being supplied from the transformer winding S-2 to said terminals through the serially related conductors 35 and 36, the magnet winding 3b, and also through the resistance VR which is bridged across said magnet winding and resistance unit.

During each period when the said contacts are "open" and which is two-thirds of the period during which the reed 5 makes a complete vibratile excursion of two successive impulses of opposite polarity are delivered from the transformer winding S-2 to the terminals D.

However, when the contacts are "closed" during the remaining one-third portion of each complete reed excursion the high voltage secondary winding S-1 of the transformer is disposed in series with the relatively low voltage winding S-2. The serial circuit including said transformer windings also include the contacts 10—6a and the current conductors 39, 45, 34, 35 and 36.

Since the voltage of the winding S-1 is approximately twice that of the winding S-2 and the current traversing the convolutions of said windings S-1 and S-2 in respectively different directions, the voltage delivered by these windings to the terminals D when said windings are disposed in serial circuit through said contacts when closed, will have a value represented by subtracting 103 from 202, to-wit 99 volts. However, since the contacts are only "closed" for one-third of a reed excursion period, only one impulse of the alternating current wave is delivered to the terminals D, such impulse being of the said polarity as that last impulse which was delivered thereto before the contacts were "closed."

Under the above assumption that the convertor system of my invention is energized from a source of 60 cycle alternating current the reed 5 is tuned to vibrate at a rate of 40 cycles per second and it may be stated that if the source of alternating current supplied to the terminals S of the system were of 50 cycles, the reed 5 would be tuned to vibrate so as to perform 33⅓ complete vibration excursions per second. It may also be stated that with the described reed and the convertor circuit here employed the reed vibrates in synchronism with the energizing current and the contacts 10—6a are opened and closed on substantially zero voltage.

It is also to be understood that two or more convertors having like reeds and the convertor circuits herein disclosed may be connected in parallel to multiply the output, and the reeds will be relatively synchronized, since each will vibrate asynchronously with the energizing alternating circuit.

The operation of the system is best described in connection with the charts of Figs. 8 to 12 inclusive which show, diagrammatically, how an initially 60 cycle alternating current, of sinusoidal form as shown in Fig. 8 is converted to an alternating current delivered from the terminals D, and whose wave form is such that a set of three successive impulses of one polarity are alternated with a set of three successive impulses of opposite polarity, to provide a single alternating current cycle of a 20 cycle current flow, each half cycle of such delivered current having three interspaced peaks of maximum current flow, the wave-form of such delivered current being under different conditions generally like the diagrams of Figs. 11 and 12.

It becomes apparent that so long as no load is connected to the terminals 30 and 40, of the set D of current delivery terminals, that the circuit of the secondary winding S-2 is broken, and said winding S-2 is ineffective and during such a condition, the magnet 3, under control of the contacts 10—6a is intermittently energized, to effect vibration of the reed 5 from the transformer winding S-1, alone.

When the two secondary windings S-1 and S-2, are operative in serial circuit during each closure of the contacts, they deliver to the terminal D, and to the load, only a single impulse or one-half of an alternating current cycle.

Referring now to the charts illustrating, symbolically, current wave forms, we may assume that Fig. 8 shows a simple alternating current of 60 cycles per second as delivered to the current supply terminals S and to the primary transformer winding P to thereby induce a 60 cycle alternating current electromotive force in the two secondary windings S-1 and S-2.

In all of Figs. 8 to 12 inclusive, a datum line $x$—$x$ is passed through the current wave showings to divide the uppermost half cycle portions from the lowermost half cycle portions, the former being marked with a plus sign (+) and the latter being each marked with a minus (—) sign.

The length of the portion of the datum line $x$—$x$ on which current impulses are superposed, represents the period of time during which occur 4½ cycles of 60 cycle alternating current and therefore, for 4½ cycles of an alternating current of a frequency of 60 cycles per second an elapsed time of $4.5/60$ or $3/40$ of one second, is represented, by the length of the occupied portion of said line.

Fig. 9, inclusive of the dotted line half wave C is identical with the showing of Fig. 8 and exclusive thereof presents a showing of successive interspaced alternating current cycles which are delivered to the terminals D solely by the low voltage transformer winding S-2 during each successive period when the said contacts are open for 1/60 of a second.

After the transformer winding S-2 has delivered each single complete cycle of alternating current to the terminals D, the contacts 1—6a then being closed for 1/120 of a second, the half cycles C shown by dotted lines in Fig. 9 are then intermittently supplied in reversed polarity to the solid straight line spaces of Fig. 9.

The dotted line half waves C of Fig. 9 are reversed in polarity by reason of the fact that the impulses C are a result of current being supplied from the high voltage transformer winding S-1 through said vibrator contacts and through the low voltage winding S-2 to the terminals D, and since the voltage induced in the high voltage transformer winding S-1 is twice as great as the opposing lesser voltage induced in the low voltage winding S-2, the resulting voltage will be 202 volts minus (—) 103 volts, or 99 volts delivered to the circuit conductors leading to load terminals D, and the half-cycle of current potential thus delivered by said winding S-1, will be of relatively reversed polarity from that indicated by dotted lines at C in Fig. 9.

In other words, these half cycles will be as shown in Fig. 10 where on the time line $x$—$x$ they are relatively interspaced and each are in vertical alignment with the dotted line half wave showing at C of Fig. 9, therefore combining the reversed half waves of Fig. 10 with the solid line current impulse of Fig. 9, the desired triple-peaked alternating current wave having 40 alternations of polarity per second, or of 20 cycles per second, is illustrated in Fig. 11. Fig. 12 illustrates the modified wave form of the triple-peaked 20 cycle alternating current of Fig. 11, which results, from the effect of the bridged resistance means R and VR, in the circuit of the transformer winding S-2, when a substantial load of telephone bells L or the like is applied to the terminals D of the convertor.

Fig. 6 shows that while the intermediate half wave of each set of three half waves of the same polarity remains substantially at nearly full voltage under load, that the first and third of each half wave of the set is reduced in voltage according to the amount of load L. This result is had beacuse the intermediate half wave of each set is delivered by the two transformer secondary windings S-1 and S-2 is directly serially connected to the delivery terminals D as a result of closing of the vibrator contacts, whereas herein the first and third impulses of each series of triple-peaked half-cycles of the delivered 20 cycle current said set are supplied solely from the transformer winding S-2, through the two parallel circuits one of which contains the variable resistance VR and the other of which contains the magnet winding 3b connected serially with the resistance unit R, and therefore these bridged resistance units lessen the amount of current delivered by the winding S-2 during each open period of the contacts 10—6a.

However, such a result is desirable from the standpoint of having the resulting current wave which is supplied to a load of bells L or the like achieve its maximum voltage at an intermediate portion of each triple-peaked half wave of delivered current and therefore cause the current delivered to a load to more closely resemble the characteristic form of a conventional sine wave.

From the foregoing description the showing of Fig. 7 which is generally like that of Fig. 6 will be readily understood, it being explained that Fig. 7 additionally shows a resistance unit 37, a condenser 32 and a radio frequency choke coil 33 for the purpose of preventing undesirable interference with radio receiving sets which may be located in the vicinity of the operative convertor of my invention. Although such radio filter instrumentalities are commonly used in connection with make-and-break contacts of electrical appliances and in many variant arrangements, for the purpose of showing one satisfactory arrangement of such instrumentalities the resistance unit 37 preferably of about 15 ohms resistance is serially included with a condenser 32 of .01 mf. capacity, these being connected directly across the contacts 10—6a and additionally I prefer to use a radio frequency choke which may have a resistance of 17 ohms, but, of course, all of these values may be varied while achieving good suppressing results.

It will be understood that instead of a single transformer T, each secondary winding may readily have an associated primary winding so that in certain of the appended claims I have sometimes referred to the transformer as transformer means and the primary winding, as primary winding means. Also in claiming my invention I find it convenient to refer to the opposite polarities of the two leads which extend from each of the secondary windings so that the contacts 10—6a may be referred to as interconnecting correspondingly electrically polarized terminals of the respective windings S-1 and S-2, whereby said windings may be serially connected in opposition to each other.

In other words, the terminals b and c of the windings S-1 and S-2 respectively are herein understood to be correspondingly polarized with respect to each other, as are also the terminals a and d. The delivery terminals 30 and 40 at D are respectively permanently connected to the terminal leads a and d whereas contacts 10—6a are respectively permanently connected to the terminal leads b and c of the two secondary windings. The serially induced magnet winding 3b and resistance R disposed in multiple with the variable resistance VR may be termed resistance means, through which current from the transformer winding S-2 may be supplied to the delivery terminals D, when the contacts 6a—10 are open.

It will be understood that the variable resistance VR having a negative thermal co-efficient of resistance will be of lower resistance when a heavier current supplied by the transformer winding S-2 flows through said resistance unit R to the load terminals D.

The transformer windings S-1 and S-2 are both preferably of much lower resistance than the resistance of the multiply connected resistance branches which include the resistance units VR and R so that when the contacts 10—6a are closed to place the two secondary windings of the transformer windings in series only a very minor portion of the current flow is delivered through said multiply connected resistance units; at the same time the presence of the aforesaid branch circuits effects a slight reduction of the voltage effective when a load is connected across the terminals D, and commonly for the purpose of supplying ringing current for a smaller telephone exchange a 50 ohm resistor is interposed between the load and the terminals D whereby the effective voltage delivered from said terminals will be of the order of 90 volts.

In other embodiments of my invention considerable variation may be had with respect to the manner for supplying current to the vibrator magnet winding 3b and the nature and resistance value of the resistance units R and VR may be altered within the purview of my invention, and, of course, the external resistance R might be omitted entirely by providing other suitable means for the lowermost terminal of the winding 3b to complete its energizing circuit.

Having described my invention in a preferred embodiment and having preferred radio filter instrumentalities associated therewith, I am aware that other numerous and extensive variations, aside from the foregoing, may be made from the convertor system herein illustrated and described but without parting from the spirit of my invention.

I claim:

1. In an electrical system for converting an alternating current of relatively high frequency to a delivered current of an effective frequency which is one-third of that of the said high frequency current, the combination with transformer means having a primary winding means which is energized by said high frequency current and a pair of secondary windings, a first of said secondary windings having approximately twice the number of inductively effective turns as the second thereof, a pair of electrical contacts adapted to be intermittently opened and closed, a motor device comprising means adapted to intermittently open and close said contacts at a frequency rate which is two-thirds of the frequency of the said high frequency current and in such manner as to cause each closure of said contacts to continue for a period which is substantially equal to one-half of the duration of each period during which said contacts are open, electrical resistance means, a pair of load terminals by which said delivered current may be supplied to a load, and a plurality of electrical circuit conductors so interconnecting said secondary windings, said contacts, said device, said resistance means, and said load terminals, that a first terminus of said second secondary winding is continuously connected to a first of said load terminals, that a first terminus of said first secondary winding is continuously connected to the second of said load terminals, and that said pair of contacts, when closed, disposes said resistance means in a serial circuit including said contacts between said second terminus of said first secondary winding and the relatively second of said load terminals and with said device being connected in parallel with said resistance means, and that both of said secondary windings, together with said contacts, are included in a serial circuit extending from one to the other of said load terminals, and that said windings are disposed in relatively reversed relation in said last recited circuit to cause them to be in opposing relation to each other when said contacts are closed, whereby all concurrent values of voltage at said load terminals will not exceed the difference between voltage values which concurrently exist, during closures of said contacts, across the pair of termini of respective ones of said secondary windings, and whereby, during each period when said contacts are opened and the circuit of said first secondary winding is thereby broken, said second secondary winding remains continuously connected serially with said resistance means across said load terminals.

2. An alternating current convertor system comprising a transformer having primary winding means adapted to be energized by current from a high frequency source and also comprising a pair of secondary windings, a first thereof having approximately twice as many inductively effective winding turns as the second thereof, a vibrator device comprising an electromagnet, a vibratile reed affording an armature for said electromagnetic, said reed adapted for asymmetrical vibration movements, a pair of make-and-break electrical contacts adapted when closed to complete a circuit for current flow from said first secondary winding to said electromagnet to energize the same to cause it to magnetically effect movement of said reed in a first direction, said contacts adapted to be opened in response to a predetermined degree of said magnetically effected reed movement and said contacts adapted to be reclosed by the retractive return movement of said reed resulting from its inherent resiliency, said reed being tuned to continuously vibrate under the control of said contacts at a cyclic rate which is substantially two-thirds of the frequency of said high frequency current, and in such asymmetrical manner as to cause each closure of said contacts to continue for a period which is substantially equal to one-half of each period during which said contacts are open, and vibrations of said vibrator reed being so timed that successive closures of said contacts are for successive periods which correspond in time and duration to successive periods of each third impulse of said high frequency current, successive of which are of opposite polarity, a resistance means, a pair of load terminals for the convertor, both of said transformer windings together with said contacts, when closed, being serially included in a circuit extending from one to the other of said load terminals with said windings being in inductively reversed opposing relation to each other in said last recited circuit whereby the voltage at said load terminals does not exceed the difference between the voltages separately existing across the terminals of respective ones of said pair of secondary windings, and said resistance means and said second transformer winding being continuously disposed in series in a second circuit which extends from one to the other of said load terminals with said electromagnet being connected in parallel with said resistance means.

3. In an electrical system for converting an alternating current of relatively high frequency to a delivered current of an effective frequency which is one-third of that of the said high frequency current, the combination with transformer means having primary winding means energized by said high frequency current and said transformer means also comprising a pair of secondary windings, a first of said windings having approximately twice the number of turns as the second of said transformer windings, a pair of electrical contacts adapted to be intermittently opened and closed, an electromagnetic motor device comprising an actuating electromagnet and means operable thereby adapted to intermittently open and close said contacts at a frequency rate which is substantially two-thirds of the frequency of said high frequency current and in such manner as to cause each closure of said contacts to continue for a period which is substantially equal to one-half of each period during which said contacts are open, a resistance means comprising the winding of said electromagnet, a pair of load terminals by which said delivered current may be supplied to a load, and electrical circuit conductors so interconnecting said secondary windings, said contacts, said electromagnet winding, and said load terminals, as to provide a serial circuit extending from a first of said load terminals through said second transformer winding to a junction with a corresponding end of each of two circuit branches, the first of said branches containing said first secondary winding and said pair of contacts in serial relation to each other, the second of said branches containing said electromagnet winding, corresponding opposite ends of both of said branches being connected to said second load terminal, the said first winding being so connected in said first branch as to serially dispose it in opposing electrical relation to said second winding during all periods when said contacts are closed, whereby the voltage at said load terminals may not exceed that value of voltage by which the voltage existing across the terminals of the said first of said secondary windings exceeds that which concurrently exists across the terminals of the said second of said secondary windings, and whereby said electromagnet winding remains continuously connected in serial circuit with said second winding across said load terminals, during all periods when said contacts are opened.

4. The electrical system substantially as set forth in claim 1, wherein said resistance means comprises a resistor having a negative co-efficient of resistivity whereby its resistance value is variable, being decreased as current flow therethrough is increased.

5. The electrical system substantially as set forth in claim 2, wherein said resistance means comprises a resistor having a negative co-efficient of resistivity whereby its resistance value is variable, being decreased as current flow therethrough is increased.

6. In an electrical system for converting an alternating current of relatively high frequency to a delivered current of an effective frequency which is one-third of that of the said high frequency current, the combination with transformer means having primary winding means energized by said high frequency current and said transformer means also comprising a pair of secondary windings, a first of said windings having approximately twice the number of turns as the second of said transformer windings, a pair of electrical contacts adapted to be intermittently opened and closed, a motor device comprising an electromagnet and means operable in response to energization of said electromagnet adapted to intermittently open and close said contacts at a frequency rate which is substantially two-thirds of the frequency of said high frequency current and in such manner as to cause each closure of said contacts to continue for a period which is substantially equal to one-half of each period during which said contacts are open, resistance means, a pair of load terminals by which said delivered current may be supplied to a load, and electrical circuit conductors so interconnecting said secondary windings, said contacts, a winding of said electromagnet, said resistance means, and said load terminals as to provide a serial circuit extending from a first of said load terminals through said second secondary winding to a junction with one end of each of three circuit branches which are in parallel relation to each other, the first of said branches containing said first winding and said pair of contacts in serial relation to each other, the second of said branches containing said electromagnet winding, and the third of said branches containing said resistance means, the opposite ends of all of said branches being connected to the second of said load terminals, said first secondary winding being so connected in said first branch as to serially dispose it in opposing electrical relation to said second transformer winding, and in parallel circuit with said resistance means during all periods when said contacts are closed, whereby the voltage at said load terminals may not exceed that value of voltage by which the voltage existing across the terminals of the said first of said secondary windings exceeds that which concurrently exists across the terminals of the said second of said secondary windings, and whereby said resistance means remains connected in serial circuit with said second winding across said load terminals, at least during all periods when said contacts are opened.

WILLIAM C. ROE.

REFERENCES CITED

The following references are of record in the file of this patent:

UNITED STATES PATENTS

| Number | Name | Date |
| --- | --- | --- |
| 1,646,662 | Roe | Oct. 25, 1927 |
| 1,854,863 | Roe | Apr. 19, 1932 |
| 1,871,904 | Niles et al. | Aug. 16, 1932 |
| 1,994,635 | Cohen | Mar. 19, 1935 |